UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

MOLDABLE MATERIAL.

1,268,031. Specification of Letters Patent. Patented May 28, 1918.

No Drawing. Application filed March 30, 1915. Serial No. 18,151.

*To all whom it may concern:*

Be it known that I, JAMES P. A. McCoy, a subject of the King of Great Britain, and a resident of Wilkinsburg, in the county of Allegheny and State of Pennsylvania, have invented a new and useful Improvement in Moldable Materials, of which the following is a specification.

My invention relates to the manufacture of molded materials, and it has special reference to methods and compositions pertaining to the manufacture of molded electrical insulation.

The objects of my invention are to prepare a novel, effective and inexpensive material of high insulating efficiency and to form such material into molded articles which shall have superior physical properties.

The compositions to which my invention relates are of the type that consists of a relatively large amount of a filling material, such as asbestos, silica, wood flour and the like, united into a compact mass by means of a relatively small amount of binder. According to my present invention, I produce a particularly efficient composition of this class by combining comminuted asbestos or other suitable filler with a polymerizable vegetable oil and then effecting the polymerization of the oil, thereby firmly binding together the particles of the filler. I prefer to make use of an oil which polymerizes throughout its whole mass at substantially the same time, as distinguished from drying oils, such as linseed oil, which dry by a process of oxidation and which therefore form films on their surfaces. China wood oil, or tung oil, is well suited to my present purpose, since this oil, upon heating, polymerizes simultaneously throughout its whole mass. Sterculia oil, or "oil of Java olives" may also be used.

In preparing molding mixtures from comminuted asbestos and a polymerizable oil such as China wood oil, about 90 parts of the asbestos may be intimately mixed with about 10 parts of the oil and sufficient solvent to form a pulp. This mixture has little or no flowing property and, therefore, the plates or other objects to be molded must be pre-shaped and dried before being subjected to the final molding treatment. The pre-shaped articles are placed in molds and pressed into their final shapes with the application of heat.

It is advantageous to add to the mixture of filler and vegetable oil a small amount of a sticky binder, such as coal tar pitch, paraindene, paracumaron or the like, in order that the sticky binder may assist in pre-shaping the mass.

Molded articles prepared according to my process possess high dielectric and tensile strength and are very resistant to mechanical shocks. The molding operation imparts an excellent polish to the molded articles and they may be sawed, cut or turned into any desired forms.

The proportions of the ingredients set forth above may be varied considerably without departing from the scope of my invention, and the manipulations to which the material is subjected may also be readily varied by persons skilled in the molding art. It is, therefore, to be understood that no limitations are to be imposed upon my invention unless indicated in the appended claims.

I claim as my invention:

1. The process of making molded articles that comprises mixing an inert filler with a vegetable oil that polymerizes substantially simultaneously throughout its mass, effecting the polymerization of the said oil, and molding the resulting mixture.

2. The process of making molded articles that comprises mixing comminuted asbestos with raw China wood oil, effecting the polymerization of the said oil, and molding the resulting mixture.

3. The process of making molded articles that comprises mixing a filler with a relatively small amount of a polymerizable vegetable oil, pre-shaping the mixture and hot-molding the pre-shaped articles.

4. The process of making molded articles that comprises mixing an inert filler with a relatively small amount of a vegetable oil that polymerizes substantially simultaneously throughout its whole mass, pre-shaping the mixture and hot-molding the pre-shaped articles.

5. The process of making molded articles that comprises mixing about 90 parts of comminuted asbestos with about 10 parts of raw China wood oil, pre-shaping the mixture and hot-molding the pre-shaped articles.

6. The process of making molded articles that comprises mixing about 90 parts of comminuted asbestos, about 10 parts of raw China wood oil and a relatively small amount of a sticky binder, pre-shaping the mixture and hot-molding the pre-shaped articles.

7. A moldable composition containing a comminuted inert filler and a vegetable oil that polymerizes substantially simultaneously throughout its whole mass.

8. A moldable composition containing comminuted asbestos and raw China wood oil.

9. A moldable composition containing comminuted asbestos, raw China wood oil and a relatively small amount of a sticky binder.

10. A moldable composition containing comminuted asbestos, raw China wood oil and a relatively small amount of coal tar pitch.

In testimony whereof, I have hereunto subscribed my name this 27th day of March, 1915.

JAMES P. A. McCOY.